United States Patent
Maté

[11] Patent Number: 5,782,500
[45] Date of Patent: Jul. 21, 1998

[54] PASSAGEWAY ALIGNED COUPLING AND PROCESS

[76] Inventor: Robert James Maté, 12803 Knollcrest, Houston, Tex. 77015

[21] Appl. No.: 451,907

[22] Filed: May 26, 1995

[51] Int. Cl.$^6$ ............................................. F16L 35/00
[52] U.S. Cl. ........................... 285/24; 285/336; 285/353; 285/368; 285/415; 285/422; 285/906; 285/917; 285/388; 29/464
[58] Field of Search .................................. 285/353, 384, 285/388, 349, 334.3, 368, 336, 369, 906, 417, 422, 415, 24–29; 29/464, 467, 890.14; 228/49.3

[56]  References Cited

U.S. PATENT DOCUMENTS

| | | | |
|---|---|---|---|
| 1,071,585 | 8/1913 | Rossell | 285/349 X |
| 1,663,228 | 3/1928 | Zublin | 285/417 |
| 1,703,696 | 2/1929 | Stratford | 285/388 |
| 1,821,867 | 9/1931 | Wilson | 285/369 X |
| 2,040,155 | 5/1936 | Shoemaker | 285/349 X |
| 2,162,184 | 6/1939 | Snyde | 285/369 X |
| 2,186,974 | 1/1940 | Ice | 285/369 X |
| 2,535,694 | 12/1950 | Payne | 285/349 X |
| 2,685,462 | 8/1954 | Lofqvist | 285/369 X |
| 2,967,068 | 1/1961 | Gressed | 285/388 X |
| 3,120,966 | 2/1964 | Lyon | 285/349 X |
| 3,208,758 | 9/1965 | Carlson | 277/171 |
| 3,301,576 | 1/1967 | Vigneron | 285/24 |
| 3,479,063 | 11/1969 | Raver | 285/108 |
| 3,560,029 | 2/1971 | Floyd | 285/369 |
| 3,594,022 | 7/1971 | Woodson | 285/336 |
| 3,749,426 | 7/1973 | Tillman | 285/336 |
| 3,797,835 | 3/1974 | Wehner | 277/171 |
| 3,797,836 | 3/1974 | Halling | 277/200 |
| 3,873,102 | 3/1975 | Lotze | 277/2 |
| 3,873,105 | 3/1975 | Wehner | 277/171 |
| 3,989,285 | 11/1976 | Yancey | 285/336 |
| 4,214,763 | 7/1980 | Latham | 277/167.5 |
| 4,358,140 | 11/1982 | Jonsson | 285/419 |
| 4,398,754 | 8/1983 | Caroleo et al. | 285/334.3 X |
| 4,522,516 | 6/1985 | Vidrine | 405/168 |
| 4,609,209 | 9/1986 | Ralls | 285/24 |
| 4,627,646 | 12/1986 | Kessel | 285/336 X |
| 4,640,537 | 2/1987 | Chaix | 285/368 |
| 4,641,859 | 2/1987 | Walters | 285/27 |
| 4,662,655 | 5/1987 | Fliervoet | 285/369 |
| 4,690,436 | 9/1987 | Hehl | 285/353 X |
| 4,691,944 | 9/1987 | Viall | 285/348 |
| 4,779,901 | 10/1988 | Halling | 285/184 |
| 4,779,902 | 10/1988 | Lee | 285/260 |
| 4,779,903 | 10/1988 | Maier | 285/336 |
| 4,838,583 | 6/1989 | Babuder | 285/354 |
| 4,881,760 | 11/1989 | Runkles | 285/93 |
| 4,900,070 | 2/1990 | Runkles | 285/233 |
| 5,040,714 | 8/1991 | McManigal | 277/1 |
| 5,058,906 | 10/1991 | Adamek | 277/167.5 |
| 5,058,935 | 10/1991 | Eidsmore | 285/330 |
| 5,135,269 | 8/1992 | Babuder | 285/328 |
| 5,135,270 | 8/1992 | Arnoldt | 285/363 |
| 5,145,219 | 9/1992 | Babuder | 285/330 |
| 5,163,712 | 11/1992 | Sabo et al. | 285/24 X |
| 5,163,721 | 11/1992 | Babuder | 285/328 |
| 5,181,730 | 1/1993 | Hjertholm | 277/167.5 |
| 5,188,400 | 2/1993 | Riley | 285/233 |
| 5,192,095 | 3/1993 | Behrens | 285/332.1 |
| 5,299,843 | 4/1994 | Weigl et al. | 285/353 X |
| 5,480,196 | 1/1996 | Adams | 285/369 |
| 5,603,152 | 2/1997 | Richard et al. | 285/24 X |

FOREIGN PATENT DOCUMENTS

| | | | |
|---|---|---|---|
| 60549 | 9/1982 | European Pat. Off. | 285/417 |
| 3250 | 3/1915 | United Kingdom | 285/417 |

*Primary Examiner*—Dave W. Arola

[57]  ABSTRACT

FIG. 2A shows an alignment and sealing arrangement for connecting two non-gender opposed conduit parts (20) and (20'). Seal (22) is captured by two opposed seal protrusions (20C) and (20C') residing on conduit part's end. Bore (18A) of alignment element (18) closely receives opposed alignment protrusions located on conduit parts' end. The alignment protrusions are substantially referenced to their respective passageways. Axial force is applied to displace opposed conduit parts toward one another to cause seal protrusions to compress seal, drawing conduit parts' passageways (20E) and (20E') into an aligned relation, and reducing adjacent mating faces into approximate flush relation with one intersection (30). This coupling has one seal removed from direct contact with media, eliminates any appreciable media entrapment space, and desirably reduces flow disturbance along passageways of conduits.

21 Claims, 2 Drawing Sheets

PASSAGEWAY ALIGNED COUPLING AND PROCESS

BACKGROUND—FIELD OF INVENTION

This invention relates generally to the alignment of bores, connecting and sealing of two axially opposed conduits, including: tubes, pipes, and component ports.

BACKGROUND—DESCRIPTION OF PRIOR ART

Industrial suppliers market a myriad of tubing fittings, couplings, and flanges for the purpose of connecting and sealing conduits, more specifically: tubes and pipes. When an application requires a minimum of flow disturbance from one conduit to the next conduit, available products are lacking on several points. U.S. Pat. Nos. 5,163,721 to Babuder (1992), 5,040,714 to McManigal (1991), 4,779,903 to Maier and Vlaykovski (1988), and 3,989,285 to Yancy (1976) place a seal between the ends of the tubular parts. This method unfavorably allows direct contact of fluid to seal, results in two bore intersections, and does not allow adjacent conduit mating faces to be in flush relative contact. U.S. Pat. No. 5,192,095 to Behrens (1993) removes the seal from the bore, but requires two seals, has an intermediate part which prevents a flush relative contact between adjacent conduit mating faces and has two bore intersections. U.S. Pat. No. 3,479,063 to Raver (1969) also removes the seal from the bore, but when flanges are welded upon their respective tubular parts and coupling is assembled, any media passing through this coupling will encounter three intersections.

These designs are incompatible with the desired reduction of flow interruptions, more specifically, flow interruptions along the inside wall. These designs rely on the bore to be concentric with the outside diameter of same tubular part. Bore interruptions due to seal location, intermediate parts, bore misalignments, and a plurality of intersections can disturb the flow and trap fluid which then lends to later contamination of fluid passed through the fitting. All the couplings heretofore known suffer from one or more disadvantages including:

a) Couplings which rely on the outer diameter of a conduit to be concentric with it's bore, exclude applications on non-concentric conduits, and lack a method to substantially align adjacent conduits' bores.

b) Couplings which have a plurality of internal intersections disrupts the flow along inside wall and interferes with delicate fluid measurements.

c) Couplings which lack a relative flush relationship between conduits' mating faces results in a void area capable of trapping unwanted substances.

d) Designs which require more than one seal per coupling add sources for leaks.

e) Designs which allow the seal (material) to directly contact media, restricts types of media which can pass through coupling.

f) Current coupling designs do not allow a conduit to directly couple to a component port with one passageway intersection and causing alignment of their passageways.

Objects and Advantages

There is need for an improved fitting or coupling assembly not subject to such problems and disadvantages described above. Several objects and advantages of my passageway aligned coupling are to provide a coupling:

a) which can be utilized on conduits whose internal passageways are not consistently referenced to conduit's outer features;

b) with one primary seal removed from direct media contact;

c) which substantially aligns internal passageways of adjacent conduits; and d) which substantially reduces flow interruptions along the inside wall from one conduit to adjacent conduit.

Further objects and advantages are to provide a coupling for both pressure and vacuum, that can be used and reused easily and conveniently without damage to coupling elements and allow for a variety of methods to draw adjacent conduits together. Still further objects and advantages will become apparent from a consideration of the ensuing description and drawings.

DRAWING FIGURES

REFERENCE NUMERALS IN DRAWINGS

Figure 1:
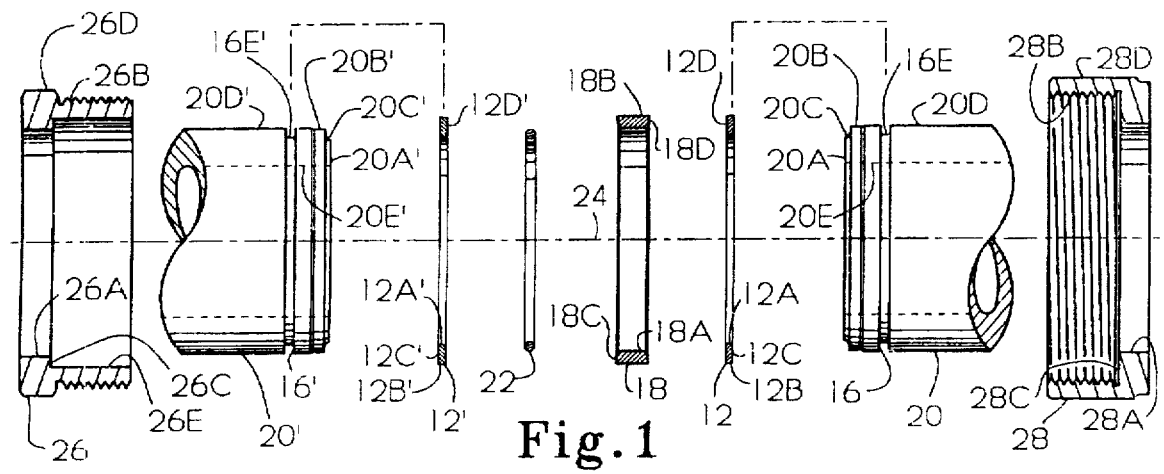
FIG. 1 shows an elevation in partial section of coupling elements in exploded condition prior to made-up condition, using union nuts.

| | | | |
|---|---|---|---|
| 12, 12' | Removable shoulder | 26A | Bore |
| 12A, 12A' | Bore | 26B | External thread |
| 12B, 12B' | Diameter | 26C | Backface |
| 12C, 12C' | Pushed face | 26D | Wrench flat |
| 12D, 12D' | Pushing face | 26E | Counterbore |
| 16, 16' | Shoulder cavity | 28 | Union member |
| 16A | Pushed face | 28A | Bore |
| 16B | Back face | 28B | Internal thread |
| 16C | Front fillet | 28C | Backface |
| 16D | Back fillet | 28D | Wrench flat |
| 16E, 16E' | Outer diameter | 30, 30' | Intersection |
| 18 | Alignment device | 32 | Component port |
| 18A | Alignment bore | 32A | Mating face |
| 18B | Diameter | 32B | Alignment diameter |
| 18C | Face | 32C | Partial seal cavity |
| 18D | Face | 32C1 | Inner seal diameter |
| 20, 20' | Conduit part | 32C2 | Fillet |
| 20A, 20A' | Mating face | 32C3 | Seal face |
| 20B, 20B' | Alignment protrusion | 32C4 | Fillet |
| 20B1 | Alignment diameter | 32C5 | Outer seal diameter |
| 20B2 | Fillet | 32D | Outer face |
| 20B3 | Face | 32E | Bore |
| 20C, 20C' | Seal protrusion | 32F | Intersection |

| | | | |
|---|---|---|---|
| 20C1 | Diameter | 32G | Receiver |
| 20C2 | Fillet | 34 | Flange |
| 20C3 | Seal face | 34A | Bore |
| 20D, 20D' | Diameter | 34B | Face |
| 20E, 20E' | Bore | 34C | Backface |
| 20F | Intersection | 34E | Counterbore |
| 22 | Seal | 34F | Perforation |
| 24, 24' | Alignment axis | 36 | Fastener |
| 26 | Union member | | |

SUMMARY

It is a major object of my passageway aligned coupling to provide an assembly of elements and procedures that will meet the above mentioned objects and advantages. As will become evident, two embodiments of the passageway aligned coupling will be presented. One embodiment connects two non-gender conduit parts which have features including: removable shoulders, bores, mating faces, and two annular protrusions. One annular protrusion is a seal protrusion, the second annular protrusion is an alignment protrusion which is referenced to its respective bore and causes alignment of opposed bores. The removable shoulders allow conduit parts to revert to their nominal diameters. The second embodiment connects one conduit part as mentioned above directly to a component port. The component port has features including: a bore, a mating face, and two recesses. One recess is a partial seal cavity, the second recess is an alignment diameter which is referenced to its respective bore and causes alignment of opposed bores. In both embodiments conduit parts are axially drawn together, a single seal is compressed without contact with bore, a relative flush condition exists between mating faces with one intersection, and bores are noticeably aligned. These embodiments allow a relatively uninterrupted flow transition from bore of one conduit to bore of adjacent conduit.

DESCRIPTION—FIGS. 1 TO 6

Referring more particularly to the drawings wherein the showings are for the purpose of illustrating a preferred embodiment of the invention only, and not for the purpose of limiting same.

Figure 2:
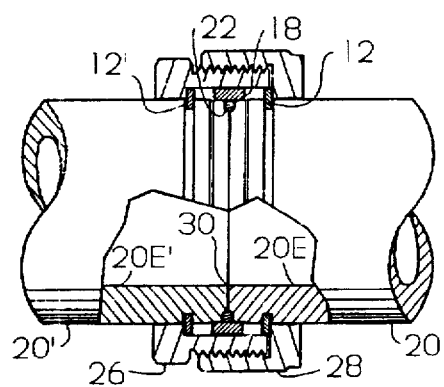
FIG. 2 shows a partial section in elevation through coupling elements of FIG. 1 in made-up condition.

A typical embodiment of the passageway aligned coupling is illustrated in partial section exploded condition in FIG. 1. and made-up condition in FIG. 2. A tubular part 20' extends along an axis 24 coaxially with a tubular part 20. Tubular parts 20' and 20 are desirably alike. A union member 26 has a bore 26A which is dimensionally larger than a diameter 20D' of tubular part 20'. Member 26 has a counterbore 26E which is desirably larger than a diameter 12B', a diameter 18B and a diameter 12B. An external thread 26B along with a wrench flat 26D reside on the outer periphery of member 26. As coupling is made-up, a backface 26C contacts a pushed face 12C' of a removable shoulder 12'. Shoulder 12' has a bore 12A' which desirably is referenced to a diameter 16E' of a shoulder cavity 16' residing on tubular part 20'. Similarly an internally threaded union member 28 has a wrench flat 28D located on its outer periphery, and a bore 28A which is desirably larger than a diameter 20D of tubular part 20. Member 28 has an internal thread 28B which desirably interengages external thread 26B. When coupling is made-up, a backface 28C contacts a pushed face 12C of a removable shoulder 12. Shoulder 12 has a bore 12A which is located upon a diameter 16E of a removable shoulder cavity 16 residing on tubular part 20.

See in FIG. 1 an alignment device 18 with an alignment bore 18A which is desirably the radially outward limit of a seal 22 and serves to align adjacent conduits. Axially adjacent to bore 18A is a face 18C. Moving radially outward along face 18C is diameter 18B which is desirably smaller than counterbore 26E. Moving axially from face 18C along diameter 18B a face 18D is found. The axial distance from face 18C to face 18D desirably assures alignment of adjacent tubular parts and is approximately three times seal 22 width. As shown, face 18C is parallel to face 18D and they are normal to bore 18A.

See also in FIG. 1 a face 12D' of removable shoulder 12' and a face 12D of removable shoulder 12 are defined as pushing faces. These pushing faces axially press upon their respective shoulder cavities 16' and 16. Face 12C' of removable shoulder 12' and face 12C of removable shoulder 12 are defined as pushed faces. These faces are axially pushed by respective union members 26 and 28.

Figure 3:
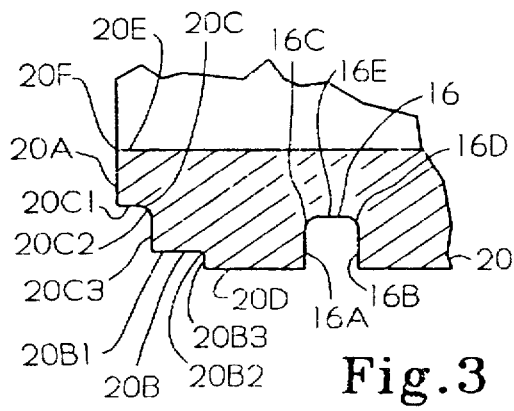
FIG. 3 shows an enlarged fragmentary section of removable shoulder tube.

Tubular parts 20' and 20 are dimensionally similar. See in FIG. 1 tubular part 20' has a bore 20E' which intersects with a mating face 20A'. Moving radially outwardly along mating face 20A' a seal protrusion 20C' is found. Moving axially away from mating face 20A' and adjacent to seal protrusion 20C is an alignment protrusion 20B'. Continued axial movement along tubular part 20' is shoulder cavity 16' with diameter 16E' whose dimensions are desirably compatible with removable shoulder 12'. Mating face 20A', seal protrusion 20C', alignment protrusion 20B' and shoulder cavity 16' are substantially geometrically referenced from bore 20E'. See in FIG. 3 a more detailed enlarged fragmentary section of tubular part 20. An intersection 20F defines the edge between a bore 20E and a mating face 20A. In this embodiment, intersection 20F is smoothly reduced approximately 0.001 inch to remove any "sharp edge". Moving radially outward along mating face 20A is annular seal protrusion 20C which is defined by: a diameter 20C1, a fillet 20C2 and a seal face 20C3. Fillet 20C2 is desirably suitable for proper compression of seal 22 and reducing stress between diameter 20C1 and partial seal cavity face 20C3. Diameter 20C1 is desirably the radially inward limit of seal protrusion 20C. The axial distance between mating face 20A and seal face 20C3 is approximately equal to: one half axial seal 22 width less one half desired axial compression displacement of seal 22. Continuing axial movement away from face 20A and adjacent to seal protrusion 20C, an alignment protrusion 20B is found. In FIG. 3 alignment protrusion 20B is defined by: an alignment diameter 20B1, a fillet 20B2 and a face 20B3. Alignment diameter 20B1 desirably is a light press fit into an adjacent alignment bore 18A. As shown in FIG. 3 diameter 20B1 is substantially referenced to bore 20E, and is less than outer diameter 20D of tubular part 20. Moving axially along alignment diameter 20B1 fillet 20B2 is located whose radius is desirably suitable for reducing stress between diameter 20B1 and alignment cavity face 20B3.

Figure 2A:
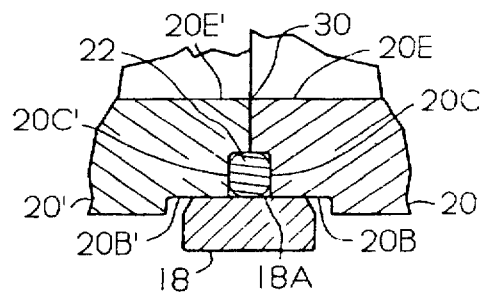
FIG. 2A shows an enlarged fragmentary section of FIG. 2 showing two tubular parts axially drawn together, bore aligned and sealed.

Moving further away from mating face 20A and axially adjacent to alignment protrusion 20B outer diameter 20D is found. Continuing axially along diameter 20 D is removable shoulder cavity 16, which is defined by: a pushed face 16A, a front fillet 16C, diameter 16E, a back fillet 16D, and a back face 16B. Moving radially inwardly and adjacent to pushed face 16A is front fillet 16C whose radius is desirably compatible with removable shoulder selected and suitable for reducing stress between pushed face 16A and diameter 16E. Diameter 16E is determined by inner diameter and type of removable shoulder used. Moving further away from mating face 20A and axially adjacent to diameter 16E is back fillet 16D whose radius is desirably compatible with removable shoulder selected and suitable for reducing stress between diameter 16E and back face 16B. The axial distance from face 16B to face 16A is determined by width, style and material of removable shoulder. Note bore 20E is the geometric reference for: mating face 20A, seal protrusion 20C, alignment protrusion 20B and removable shoulder cavity 16. FIG. 2 and FIG. 2A show two opposed dimensionally alike conduit parts 20 and 20' with respective bores 20E and 20E' aligned by their respective alignment protrusions 20B and 20B' inside bore 18A of alignment device 18. See two seal protrusions 20C and 20C" hold and compress one seal 22 which does not contact bore 20E or 20E'. See also one bore intersection 30 between opposed tubular parts.

Figure 4:
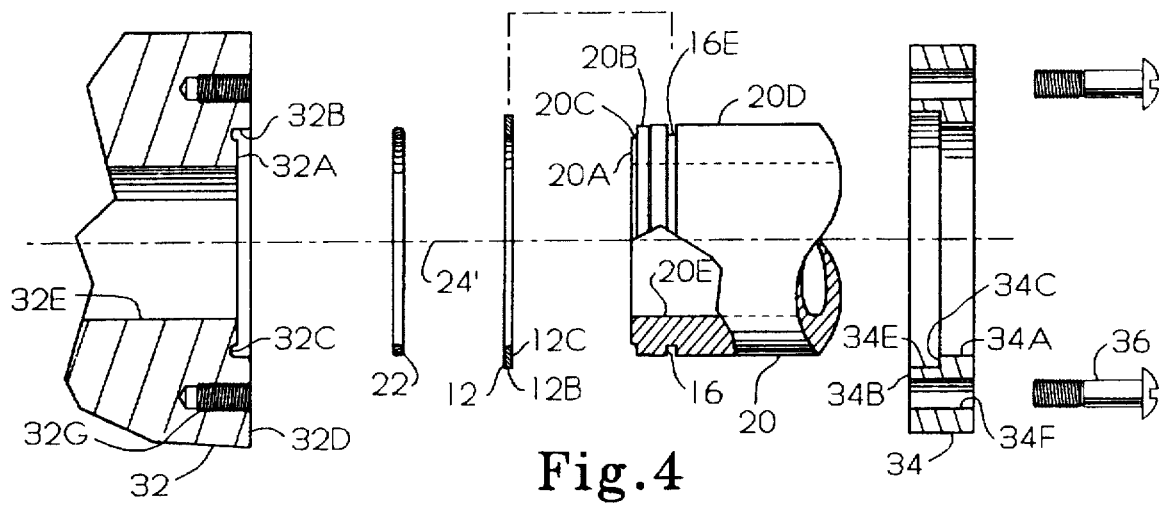
FIG. 4 shows an elevation of coupling elements of component port in exploded condition prior to made-up condition, using bolted flange.
Figure 5:
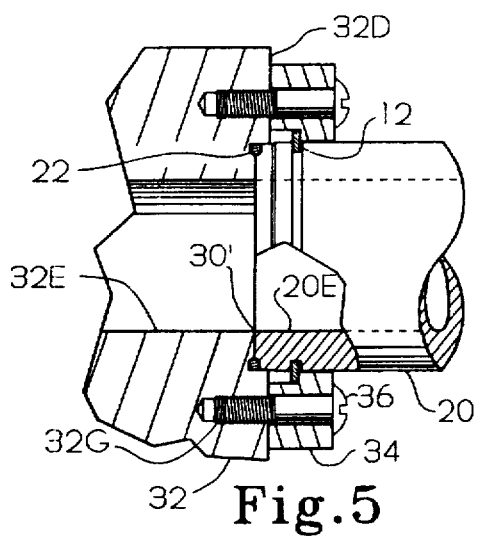
FIG. 5 shows a partial section in elevation through component port and non-gender removable shoulder tube, showing elements in made-up condition.

When a coupling is required to connect a conduit directly to a component port with a minimum of flow interruptions, one intersection and approximately zero void, an embodiment as shown in a partial section exploded condition in FIG. 4, and made-up condition in FIG. 5 can be utilized. FIG. 4 shows components exploded along an axis 24'. A flange 34 has perforations, one such perforation represented by a perforation 34F connected by fasteners represented by a fastener 36 to a component port 32 by way of fastener receivers, represented by a receiver 32G. Flange 34 has a bore 34A which is desirably larger than diameter 20D of tubular part 20. Flange 34 has a counterbore 34E which is desirably larger than diameter 12B of removable shoulder 12. A backface 34C serves as a pusher surface against pushed face 12 C of removable shoulder 12. Alignment protrusion 20B desirably is substantially geometrically referenced from bore 20E and desirably is a light press fit into an alignment diameter 32B of component port 32. Moving axially along alignment recess 32B is a partial seal cavity 32C. Partial seal cavity 32C in conjunction with adjacent seal protrusion 20C provide a complete seal cavity in which seal 22 resides. Moving radially inward from seal cavity 32C a mating face 32A is located. Continuing movement along mating face 32A a bore 32E is located.

Figure 5A:
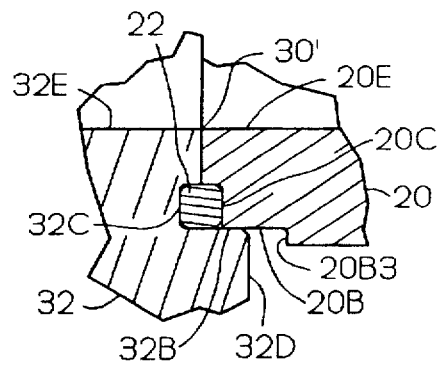
FIG. 5A is an enlarged fragmentary section of FIG. 5 showing component port, seal, and non-gender removable shoulder tube.

See the transition from an exploded view in FIG. 4 to a made-up view in FIG. 5 in which a flange face 34B is drawn towards an outer face 32D of component port 32. Fastener 36 is engaged in receiver 32G and holds flange 34 against face 32D of component port 32. Tubular part 20 is pressed and held by flange 34 pressing against removable shoulder 12. By pressing removable shoulder 12 located in shoulder cavity 16, mating face 20A is pressed in a relative flush relationship with mating face 32A. See more clearly in FIG. 5A alignment protrusion 20B is aligned in alignment diameter 32B. Desirably an axial clearance exists between face 32D and face 20B3. Note one seal 22 is located in partial seal cavity 32C and seal protrusion 20C and away from direct contact with bore 32E or 20E. Note also alignment protrusion 20B causes bore 20E to relatively align with bore 32E with a single intersection 30'.

Figure 6:
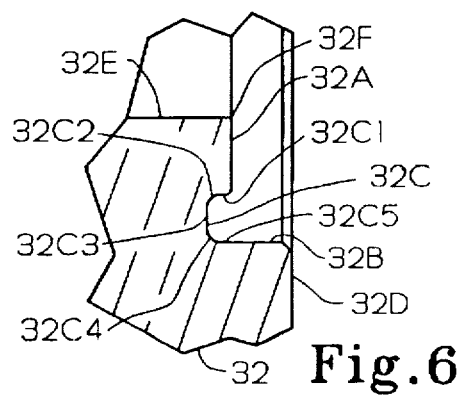
FIG. 6 shows an enlarged fragmentary section of component port.

FIG. 6 shows an enlarged fragmentary section of component port 32. An intersection 32F defines the edge between bore 32E and mating face 32A. Intersection 32F is smoothly reduced approximately 0.001 inch to remove any "sharp edge". Moving radially outward along mating face 32A is partial seal cavity 32C, defined by an inner diameter 32C1, a fillet 32C2, a seal face 32C3, a fillet 32C4, and an outer diameter 32C5. Inner diameter 32C1 is desirably the radially inward limit of partial seal cavity 32C. Moving axially away from face 32A is fillet 32C2, whose radius is desirably suitable for proper compression of seal 22 and reducing stress between inner seal diameter 32C1 and seal face 32C3. The axial distance between mating face 32A and seal face 32C3 is approximately equal to: one half axial seal 22 width less one half desired axial compression displacement of seal 22. Continued radial movement along seal face 32C3, fillet 32C4 is located whose radius is desirably suitable for proper compression of seal 22 and reducing stress between seal face 32C3 and outer seal diameter 32C5. Outer seal diameter 32C5 is desirably the radially outward limit of partial seal cavity 32C. Axially adjacent to outer seal diameter 32C5, alignment diameter 32B is located and desirably receives alignment protrusion 20B with a light press fit. In FIG. 6, outer seal diameter 32C5 is approximately equal to alignment diameter 32B. Further axial movement along alignment diameter 32B outer component face 32D is located. The axial distance between mating face 32A and outer face 32D is desirably a length which assures alignment of adjacent tubular part, and is approximately three times seal 22 width.

Conduit parts 20, 20' and 32 are selected from a group of materials including: steel, stainless steel, beryllium copper, acrylic, fiberglass, PVC, TFE fluorocarbon, ceramics, cermets, glass, and can exist in composite form including: laminar composites, particulate composites, and fiber reinforced composites.

Seal 22 is selected from a group of materials including: elastomers, copper, nickel, silver, stainless steel, graphite, ceramics, graphite impregnated packing, and TFE fluorocarbon, and selected form a group of crossections including: circular, oval, "C" shaped, square and rectangular.

Removable shoulders 12 and 12' are selected from a group of materials including: carbon steel, beryllium copper, spring steel, stainless steel, ceramics, cermets, plastics and elastomers; from a group of styles including: segmented members, "push-on" retaining rings, snap rings, wave rings, "D" rings, "E" rings, spiral rings, split rings, segmented rings and "O"-rings; and from a group of crossections including: round, square, rectangular, and elliptical.

Operation—FIGS. 1, 2, 4, 5

A typical embodiment of the passageway aligned coupling connecting two adjacent tubular parts is illustrated in exploded condition in FIG. 1. Two removable shoulder tubular parts 20' and 20 extend coaxially along axis 24 and have opposed ends. Bore 26A of externally threaded union member 26 locates upon diameter 20D' of tubular part 20' with wrench flat 26D facing away from mating face 20A'. Removable shoulder 12' is placed in removable shoulder cavity 16' residing on tubular part 20' with diameter 12A' relatively located upon diameter 16E' of part 20'. Similarly bore 28A of internally threaded union member 28 locates upon diameter 20D of tubular part 20 with wrench flat 28D facing away from mating face 20A. Removable shoulder 12 is placed in shoulder cavity 16 residing on tubular part 20 with diameter 12A relatively located upon diameter 16E. With face 18C of alignment device 18 toward mating face 20A' of tubular part 20', bore 18A of alignment device 18 is axially located upon alignment protrusion 20B' on tubular part 20'. With sufficient axial force, alignment device 18 is urged further along alignment protrusion 20B' an axial distance approximately equal to one half axial length of alignment device 18. Seal 22 is placed in bore 18A. With mating face 20A of tubular part 20 adjacent to face 18D of alignment device 18 alignment diameter 20B is placed inside bore 18A. With sufficient axial force, mating faces 20A' and 20A are urged toward one another, their respective alignment diameters 20B' and 20B aligned inside bore 18A. As mating faces 20A' and 20A of tubular parts 20' and 20 continue to be axially displaced along axis 24 toward each other, seal 22 is captured by seal protrusions 20C' and 20C. Continued axial displacement causes desired compression of seal 22 and a relative flush condition of mating faces 20A' and 20A.

Tubular parts 20' and 20 are provided with removable shoulders 12' and 12 facing axially opposite away from seal. Force is applicable against those shoulders to urge tubular parts 20' and 20 axially toward one another. In the embodiment shown in FIG. 1 and FIG. 2, two union nut members 26 and 28 provide the sufficient axial force. See in this regard external threaded union member 2 6 and internal threaded union member 28, adapted to coaxially receive respective tubular parts 20' and 20, and to transmit axial forces thereto, via removable shoulders 12' and 12. Bore 26A of member 26 receives outer surface 20D' of tubular part 20', and counterbore 26E receives outer diameters 12B', 12B and 18B. Shoulder 26C acts as pusher surface upon pushed face 12C' of removable shoulder 12'. Member 26 also has an external screw thread 26B for threaded interengagement with interior thread 28B on member 28. Bore 28A of member 28 locates upon outer diameter 20D of tubular part 20. Shoulder 28C acts as a pusher surface upon pushed face 12C of removable shoulder 12. Upon make-up of coupling, nut member 28 is rotatably threaded onto member 26, while the latter is held against rotation, as by a wrench gripping external flats 26D on member 26. Flats 28D on member 28 may also be gripped by a wrench. Such rotation of member 28 brings step shoulder 28C into forcible engagement with pushed face 12C of removable shoulder 12. Make-up force is thus transmitted via removable shoulder 12 residing in removable shoulder cavity 16 to part 20. The rotation of member 28 also causes step shoulder 26C into forcible engagement with pushed face 12C' of removable shoulder 12'. Make-up force is thus transmitted via removable shoulder 12' residing in removable shoulder cavity 16' to part 20'.

A typical embodiment of the passageway aligned coupling connecting tubular part 20 to component port 32 is illustrated in exploded condition in FIG. 4 and made-up condition in FIG. 5. See in FIG. 4 component port 32 and tubular part 20 extend coaxially along axis 24' and have opposed ends. Bore 34A of flange 34 locates upon diameter 20D of tubular part 20 with flange face 34B toward outer face 32D of component port 32. Removable shoulder 12 is placed in shoulder cavity 16 residing on tubular part 20. Seal 22 is placed inside partial seal cavity 32C of component port 32. With mating face 20A of tubular part 20 toward mating face 32A of component port 32, Alignment diameter 20B of tubular part 20 is placed inside alignment diameter 32B. With sufficient axial force, mating faces 20A and 32A are urged toward one another. Axial force is provided by engaging fasteners into receivers, represented by fastener 36 passing through perforation 34F into receiver 32G. Thus axial force is transmitted to flange 34 onto shoulder 12 and then transmitted to tubular part 20. As mating faces 20A and 32A continue axial displacement along axis 24', seal 22 is captured by seal protrusion 20C and partial seal cavity 32C. Continued axial displacement causes alignment of bores 32E and 20E, desired compression of seal 22, and a relative flush condition of mating faces 32A and 20A. The axial distance from face 34B to shoulder 34C of flange 34 desirably assures a relative flush condition of mating faces 32A and 20A. This axial distance will vary with selection of material, size and style of removable shoulder and is approximately: the axial distance from mating face 20A to pushed face 16A seen in FIG. 3, plus removable shoulder width less the axial distance from mating face 32A to outer face 32D.

Summary, Ramifications, and Scope

The provided coupling is characterized as interconnecting two opposed conduit parts having: a passageway, a mating face, a partial seal cavity, and an alignment feature. The alignment feature is substantially referenced to its respective passageway. A seal is held between opposed partial seal cavities. The opposed ends are displaced toward one another to cause partial seal cavities to compress seal, drawing conduit parts' passageways into an aligned relation, and reduces adjacent mating faces into approximate flush relation with one passageway intersection. This design removes seal from direct contact with media, eliminates any appreciable media entrapment space, and desirably reduces flow disturbance along passageways of conduits.

Although the description above contains many specificities, these should not be construed as limiting the scope of the invention but as merely providing illustrations of some of the presently preferred embodiments of this invention. For example:

a') The passageway aligned coupling can have other crossections, including: oval, triangle square, rectangle, polygonal and irregular.

b') A "zero insertion length" passageway aligned coupling between two non-gender conduit parts can be constructed.

c') Seal protrusions can be modified, such as knife edge protrusions to penetrate seal materials including annealed copper.

d') Different methods of drawing and clamping adjacent conduits together can be used including a tapered swing clamp.

e') Thin wall conduit parts can use this coupling design by attaching an end element with approximately same end features.

f') Removable shoulders may be of the design that attach directly to conduit part without requiring a removable shoulder cavity.

g') The removable shoulder can provide axial compensation of coupling elements by selecting materials and physical configurations which impart desired elastic properties.

h') Conduit parts with fixed shoulders (not removable) can be utilized.

i') Embodiments that connect adjacent conduit parts whose passageways are not in a straight line, such as a curved line can utilize this coupling design.

j') This coupling may be utilized to transmit forces, including: axial and torsional.

k') This coupling may be utilized to convey a variety of media including: liquid, gas, slurry, sound, electron beam, microwave, and light.

l') This coupling may be utilized in long runs of conduit, to gain access to devices including instrumentation, taking advantage of this design to reduce flow disturbance to a minimum, with one seal removed from direct contact with media, zero-void, and one intersection. Thus the scope of the invention should be determined by the appended claims and their legal equivalents, rather than by the examples given.

I claim:

1. In the method of relatively aligning a passageway of a conduit part with a passageway of an adjacent conduit part and sealing off with a seal between the opposed ends of said conduit parts, each said conduit part comprising: a mating face, a passageway, a partial seal cavity means for receiving a seal, and having predetermined dimensions, and a formed alignment feature means referenced to said passageway, the steps that include:

a) locating said mating faces in spaced apart relation, with said conduit parts extending coaxially, b) locating a seal upon one said partial seal cavity means, c) aligning the passageways via their respective alignment feature means, d) providing a means to displace the conduit parts toward each other, causing said seal cavity means to engage opposite sides of said seal, and e) further displacing the mating faces into an approximate flush relation, thereby providing the alignment of adjacent passageways and sealing off between said passageways with said seal at the interfaces of said mating faces.

2. The method of claim 1 wherein the alignment feature means of step c) is provided by the alignment feature of one said conduit closely receiving the alignment feature of the opposed conduit.

3. The method of claim 1 wherein the alignment feature means of step c) includes an alignment device having an inner alignment feature which closely receives the opposed conduits' alignment features.

4. The method of claim 1 wherein each said partial seal cavity has an axial length approximately: one half axial seal width less one half desired compression displacement of said seal.

5. The method of claim 1 wherein the passageways are circular in shape.

6. The method of claim 1 wherein the formed alignment features are circular in shape.

7. The method of claim 1 wherein said seal is an O ring.

8. The method of claim 1 wherein said seal consists of an elastomer material.

9. The method of claim 1 wherein said seal consists of an metallic material.

10. The method of claim 1 step d) wherein said displacement means causes the opposed seal cavities to compressively deform said seal.

11. The method of claim 1 wherein said conduit is plastic tubing.

12. The method of claim 10 wherein the engagement of said mating faces limits and compression of said seal.

13. A reusable coupling assembly for relatively aligning a passageway of a conduit part with a passageway of an adjacent conduit part, and sealing off between the conduits with a seal, said coupling assembly comprising:

a) adjacent conduit parts ends having identical end features, which include: a mating face, a passageway, a partial seal cavity means for receiving a seal, and having predetermined dimensions, and a seal in said partial seal cavities, and a formed alignment feature referenced to said respective passageway, b) an alignment element which closely receives the opposed alignment features of the conduits, c) a means to displace the conduit parts toward each other, causing the seal cavities to engage opposite sides of said seal, and d) thereby displacing the mating faces into an approximate flush relation with one passageway intersection.

14. The reusable coupling assembly of claim 13 wherein said displacement means causes the opposed seal cavities to compressively deform said seal.

15. The resuable coupling assembly of claim 13 wherein said passageways are circular in crossection.

16. The resuable coupling assembly of claim 13 wherein said displacement means includes a shoulder on each conduit part.

17. The resuable coupling assembly of claim 16 wherein said shoulders are removable.

18. A reusable coupling assembly for relatively aligning a passageway of a conduit part with a passageway of an adjacent component part, and sealing off between the conduits with a seal, said coupling assembly comprising:

a) a conduit part including, a mating face, a passageway, a partial seal cavity means for receiving a seal, and having predetermined dimensions, and a formed alignment feature referenced to said passageway, b) a component part including: an outer face, a mating face, a passageway, a partial seal cavity means for receiving a seal, and having predetermined dimensions, and a formed alignment feature referenced to said passageway and a seal in said partial seal cavities, c) said the alignment feature of said component part closely receives said alignment feature of said conduit part, d) a means to displace said conduit and said component parts toward each other, causing said seal cavities to engage opposite sides of said seal, and e) thereby displacing said mating faces into an approximate flush relation with one passageway intersection.

19. The reusable coupling assembly of claim 18 wherein said displacement means includes a shoulder on said conduit part.

20. The reusable coupling assembly of claim 19 wherein said shoulder is removable.

21. The reusable coupling assembly of claim 18 wherein said passageways are circular in crossection.

* * * * *